United States Patent
Astle

(10) Patent No.: US 6,529,613 B1
(45) Date of Patent: Mar. 4, 2003

(54) MOTION TRACKING USING IMAGE-TEXTURE TEMPLATES

(75) Inventor: Brian Astle, Princeton, NJ (US)

(73) Assignee: Princeton Video Image, Inc., Lawrenceville, NJ (US)

( * ) Notice: Subject to any disclaimer, the term of this patent is extended or adjusted under 35 U.S.C. 154(b) by 0 days.

(21) Appl. No.: 09/308,949

(22) PCT Filed: Nov. 26, 1997

(86) PCT No.: PCT/US97/21608
§ 371 (c)(1),
(2), (4) Date: May 26, 1999

(87) PCT Pub. No.: WO98/24243
PCT Pub. Date: Jun. 4, 1998

Related U.S. Application Data

(60) Provisional application No. 60/031,883, filed on Nov. 27, 1996.

(51) Int. Cl.[7] .................................................. G06K 9/00
(52) U.S. Cl. ...................... 382/103; 382/107; 382/199; 382/209; 382/284; 382/291; 348/135; 348/169; 348/584
(58) Field of Search ................................. 382/103, 107, 382/218, 284, 209, 217, 199, 118, 291; 348/584, 585–592, 169, 135; 395/118, 133, 135, 127

(56) References Cited

U.S. PATENT DOCUMENTS 4,924,310 A * 5/1990 Von Brandt ................. 375/240
5,280,530 A * 1/1994 Trew et al. .................. 382/103
5,353,392 A   10/1994 Luquet et al. ............... 395/135
5,566,251 A * 10/1996 Hanna et al. ................ 382/284
5,576,767 A * 11/1996 Lee et al. ............... 375/240.14
5,646,679 A    7/1997 Yano et al. ..................... 348/47
5,649,032 A    7/1997 Burt et al. ................... 382/284
5,666,208 A *  9/1997 Farrell et al. ................ 358/296
6,075,895 A *  6/2000 Qiao et al. ................... 382/218

* cited by examiner

Primary Examiner—Leo Boudreau
Assistant Examiner—Sheela Chewan
(74) Attorney, Agent, or Firm—Woodbridge & Associates, P.C.; Richard C. Woodbridge, Esq.; Thomas J. Onka, Esq.

(57) ABSTRACT

Image templates are extracted from video images in real-time and stored in memory. Templates are selected on the basis of their ability to provide useful positional data and compared with regions of subsequent images to find the position giving the best match. From the position data a transform model is calculated. The transform model tracks the background motion in the current image to accurately determine the motion and attitude of the camera recording the current image. The transform model is confirmed by examining pre-defined image templates. Transform model data and camera sensor data are then used to insert images into the live video broadcast at the desired location in the correct perspective. Stored templates are periodically updated to purge those that no longer give valid or significant positional data. New templates extracted from recent images are used to replace the discarded templates.

22 Claims, 8 Drawing Sheets

FIG. 2A

| 0 | 1 | -1 | 0 |
|---|---|----|---|
| 0 | 1 | -1 | 0 |
| 0 | 1 | -1 | 0 |
| 0 | 1 | -1 | 0 |
| 0 | 1 | -1 | 0 |
| 0 | 1 | -1 | 0 |
| 0 | 1 | -1 | 0 |
| 0 | 1 | -1 | 0 |

FIG. 2B

| 32  | 40  | 43  | 73  | 191 | 189 | 175 | 156 |
|-----|-----|-----|-----|-----|-----|-----|-----|
| 41  | 51  | 57  | 65  | 182 | 202 | 169 | 162 |
| 56  | 61  | 53  | 84  | 179 | 203 | 160 | 148 |
| 89  | 97  | 101 | 122 | 180 | 197 | 152 | 147 |
| 169 | 174 | 179 | 182 | 185 | 199 | 155 | 139 |
| 183 | 179 | 181 | 180 | 188 | 195 | 148 | 137 |
| 153 | 147 | 132 | 150 | 145 | 157 | 132 | 120 |
| 84  | 81  | 62  | 30  | 82  | 91  | 87  | 82  |

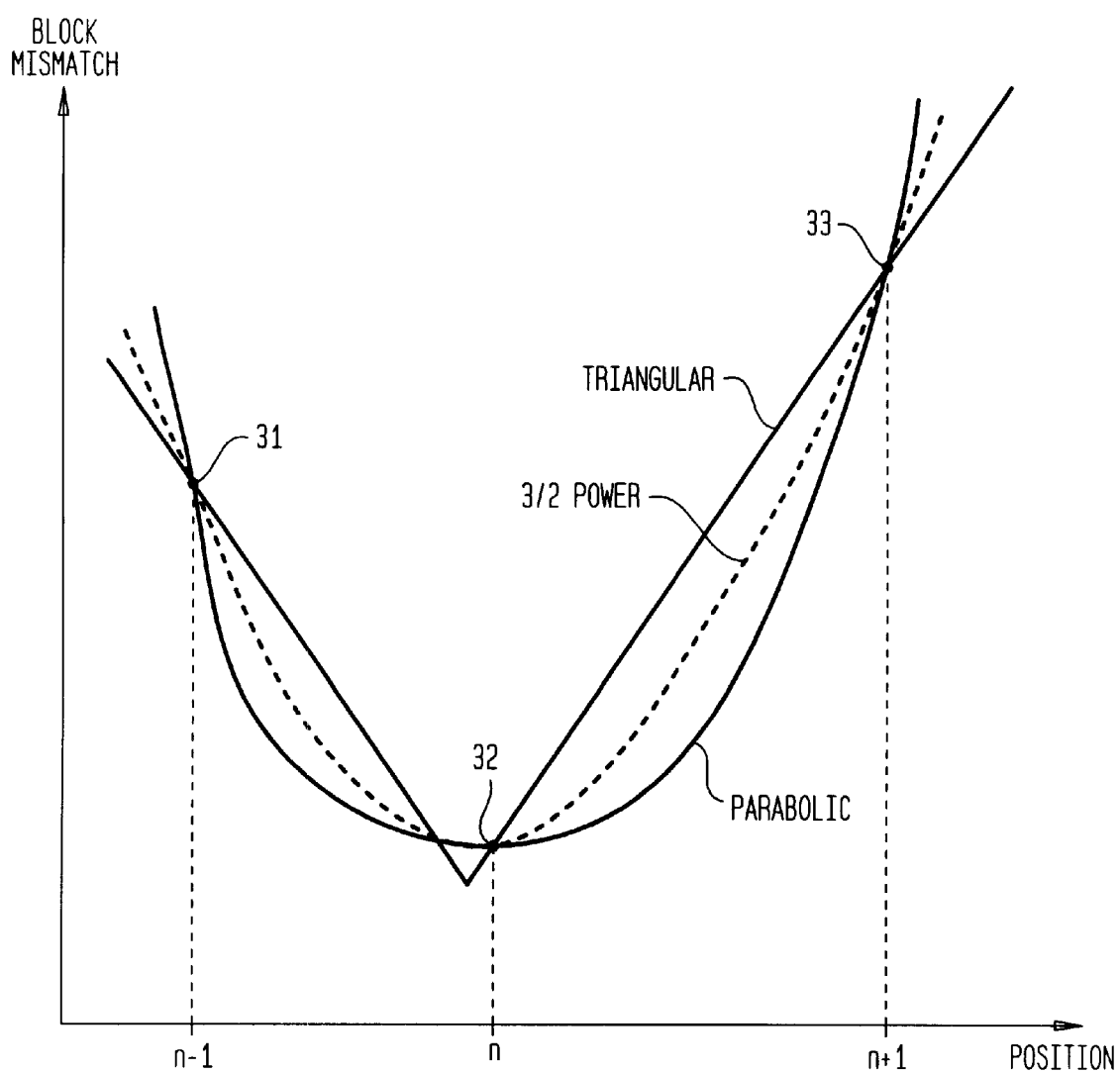

FIG. 6A

| 40 | 42 | 46 |
|----|----|----|
| 44 | 52 | 60 |
| 44 | 44 | 40 |

FIG. 6B

| 40 | 40 | 41 | 41 | 42 | 43 | 44 | 45 | 46 |
|----|----|----|----|----|----|----|----|----|
| 41 | 41 | 42 | 43 | 44 | 45 | 47 | 48 | 49 |
| 42 | 43 | 44 | 45 | 47 | 48 | 50 | 51 | 53 |
| 43 | 44 | 46 | 47 | 49 | 51 | 53 | 54 | 56 |
| 44 | 46 | 48 | 50 | 52 | 54 | 56 | 58 | 60 |
| 44 | 45 | 47 | 48 | 50 | 50 | 51 | 53 | 55 |
| 44 | 45 | 46 | 47 | 48 | 47 | 47 | 48 | 50 |
| 44 | 44 | 45 | 45 | 46 | 45 | 44 | 44 | 45 |
| 44 | 44 | 44 | 44 | 44 | 43 | 42 | 41 | 40 |

FIG. 6C

| 42 | 47 |
|----|----|
| 47 | 51 |

| -1 | 1 |
|----|---|
| -1 | 1 |
| -1 | 1 |
| -1 | 1 |
| -1 | 1 |
| -1 | 1 |
| -1 | 1 |
| -1 | 1 |

| -1 | -1 | -1 | -1 | -1 | -1 | -1 | -1 |
|----|----|----|----|----|----|----|----|
| 1  | 1  | 1  | 1  | 1  | 1  | 1  | 1  |

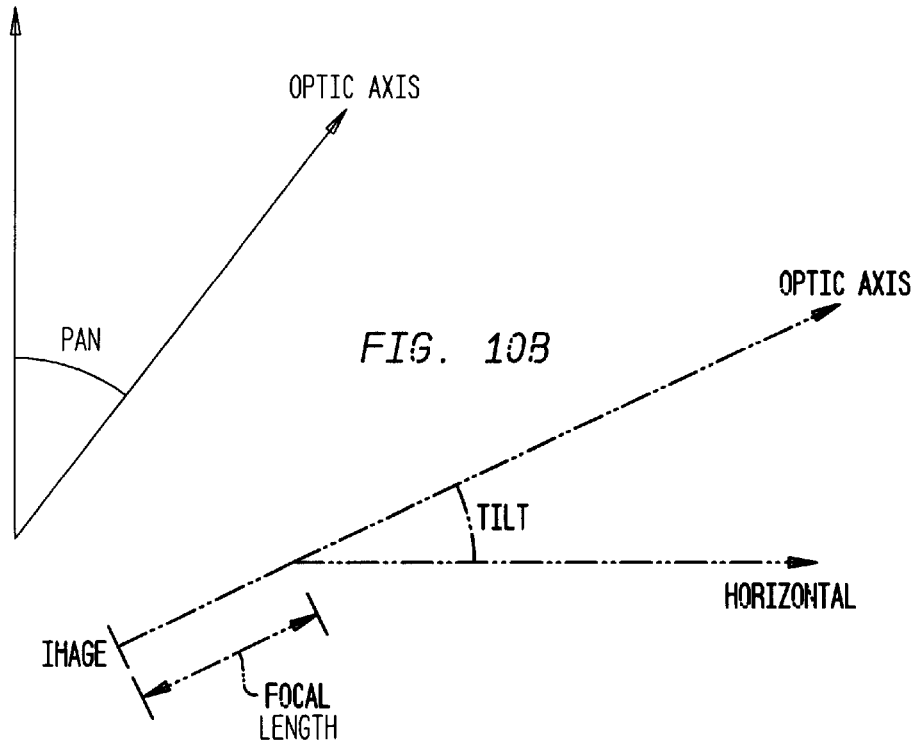
FIG. 10A
FIG. 10B
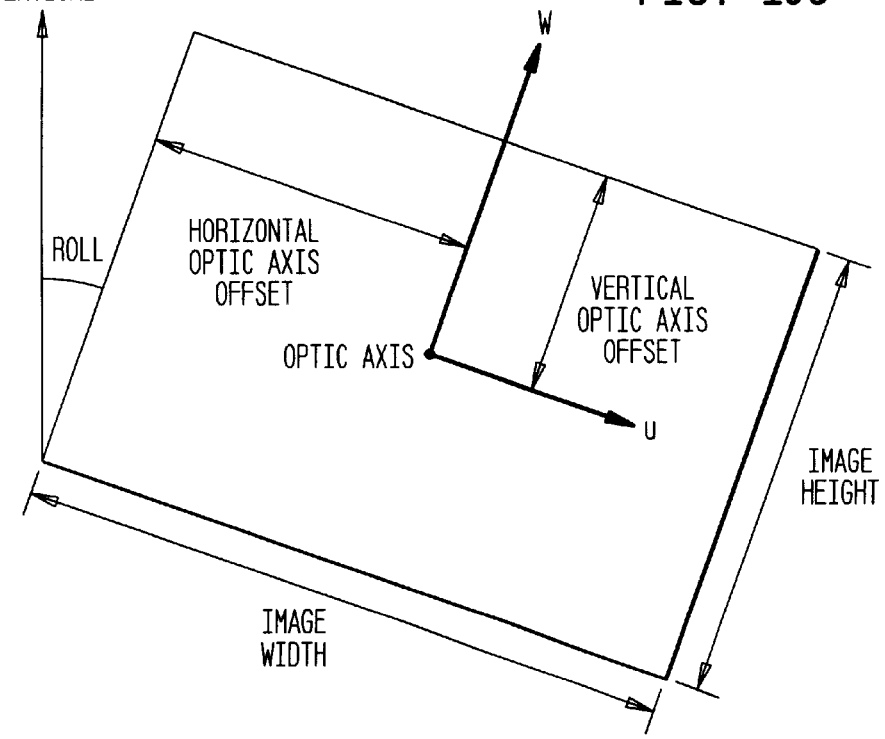
FIG. 10C

MOTION TRACKING USING IMAGE-TEXTURE TEMPLATES

CROSS REFERENCE TO RELATED APPLICATIONS

The present application is related to and claims the benefit of U.S. provisional application No. 60/031,883 filed Nov. 27, 1996 entitled "Camera Tracking Using Persistent, Selected, Image-Texture Templates".

The present application is also related to the following co-pending commonly owned applications: U.S. Provisional Application Serial No. 60/038,143 filed on Nov. 27, 1996 entitled "IMAGE INSERTION IN VIDEO STREAMS USING A COMBINATION OF PHYSICAL SENSORS AND PATTERN RECOGNITION"; Serial No. 08/563,598 now U.S. Pat. No. 5,892,554 filed Nov. 28, 1995 entitled "SYSTEM AND METHOD FOR INSERTING STATIC AND DYNAMIC IMAGES INTO A LIVE VIDEO BROADCAST"; Serial No. 08/580,892 now U.S. Pat. No. 5,808,695 filed Dec. 29, 1995 entitled "METHOD OF TRACKING SCENE MOTION FOR LIVE VIDEO INSERTION SYSTEMS"; and Serial No. 08/662,089 now U.S. Pat. No. 5,953,076 filed Jun. 12, 1996 entitled "SYSTEM AND METHOD OF REAL-TIME INSERTIONS INTO VIDEO USING ADAPTIVE OCCLUSION WITH A SYNTHETIC COMMON REFERENCE IMAGE".

FIELD OF THE INVENTION

The present invention relates to improvements in systems that insert selected indicia into live video broadcasts.

DESCRIPTION OF RELATED ART

Electronic devices for inserting indicia into live video broadcasts have been developed and used for the purpose of inserting advertising, for instance, into sports events. The viability of such devices depends directly on their ability to make the insertion seamlessly and appear as realistically as possible to be part of the actual scene. The insertion must also be robust enough to handle typical camera manipulations such as panning, tilting, zooming, etc. without compromising the integrity of the broadcast.

A key component in any such indicia insertion system is the ability to track scene motion and background motion from image to image in the broadcast. Reliable tracking data is necessary in order to calculate transform models that adjust an intended insertion to the proper size and perspective prior to insertion of an image in each new image frame.

U.S. Pat. No. 5,264,933 to Rosser notes that standard methods of pattern recognition and image processing can be used to track background and scene motion. The standard methods of pattern recognition and image processing referred to are feature tracking using normalized correlation of previously stored image templates. These methods work well but not under all conditions.

Subsequent methods have incorporated what has been termed "adaptive geographic hierarchical tracking" in which an elastic model is used to extend the domain of image frames that can be tracked adequately. The extended domain includes noisy scenes containing a great deal of occlusion. Occlusion refers to action in the current image obscuring some or most of the preselected landmarks utilized by an insertion system to calculate the position and perspective of an insert in the live broadcast. The extended domain also includes images containing rapid variations in overall illumination conditions. Adaptive geographic hierarchical tracking requires at least three separate landmarks always be visible in the image as it is being tracked. Since precise image conditions cannot be predicted ahead of time a block matching technique termed "unnormalized correlation" is usually employed.

The present invention further extends the domain of image frames that can be tracked to include frames in which there are no pre-selected landmarks visible. Unlike adaptive geographic hierarchical tracking, which preferably uses pre-defined synthetic templates, the present invention uses templates taken from the stream of images being broadcast.

There is also prior art concerning motion estimation schemes. Digital video encoders employing motion estimation for data compression purposes extract image templates from video images and calculate motion vectors. A current image is tiled with a set of templates and motion vectors are calculated for each template using a previously transmitted image. The object is to reduce the number of bits needed to encode an image block by transmitting only a motion vector plus an optional correction factor as opposed to transmitting a complete image block. After coding the image the templates are discarded.

Typical block matching criteria for this scheme include L1 norm, L2 norm, and normalized correlation. L1 norm is defined as $D=\Sigma d$, L2 norm is defined as $\Sigma d^2$ where d is the difference in pixel values between the image and the template. The summation is carried out over all the pixels in each template. The nomalied corelation is defined as:

$$N = \frac{\sum IT}{\sqrt{\sum I^2 \sum T^2}}$$

where T represents the values in the template and I represents the values in the image.

In this description, block matching techniques will be defined so that the best match corresponds to the smallest value of the selected matching criteria. Thus, if normalized correlation were used as the block matching criteria the mismatch would be defined as:

$$M = 1 - N = 1 - \frac{\sum IT}{\sqrt{\sum I^2 \sum T^2}}$$

As the template is moved over the current image the resulting array of values calculated using the selected block matching criteria is called an error surface and the best match occurs when the error surface has a minimum value. BRIAN ASTLE Since the average illumination levels in the current image are likely to be similar to the matching blocks in the previously transmitted image, block matching is more reliable than using methods which include the average illumination information.

The present invention differs from motion estimation used in video encoding in a number of significant ways. In the present invention the templates are a carefully selected subset of the total blocks available rather than all possible positions. Careful choice of a region and template is necessary because, unlike motion estimation in compression algorithms, the result of the present calculation is not a set of motion vectors for the blocks, but rather a single transform model. In a "least square error" sense the single transform model is the best descriptor of the motion of the template ensemble. Moreover, the templates are placed in selected positions in the image rather than tiling the image. Further, the templates are stored in memory and are not discarded after each image is processed.

In the present invention, the current position of a template is determined relative to this previous position whereas in motion estimation the previous position is determined relative to the current tiled position. Motion estimation in video encoding is directed toward finding the best displacement match, i.e. that with the smallest coding error, to the current image from a previously transmitted image. In contrast, position location of the present invention is directed toward the visual correctness (the viewer's perception of the image) of the motion of the image. In ambiguous cases it is not important how motion estimation in video coding resolves the ambiguity but it is critical how the position location method of the present invention resolves the ambiguity. Resolution of the ambiguity may involve examination of the model as determined from other nearby blocks. Motion estimation has limited accuracy, often to ½ pixel, due to computational and coding requirements associated with increased accuracy. In position location, however, there are no such limits on accuracy.

SUMMARY

The present invention utilizes image templates taken directly from a broadcast video stream. Depending on the intended application, i.e. baseball, football, soccer, etc., specific capturing criteria are used to select templates from the current image. For long term spatial stability, templates are stored in memory and remain useful so long as the templates continue to meet certain retention criteria. Retention criteria include a satisfactory match to the current image of the broadcast as well as spatial consistency with other templates. Spatial consistency means that templates to be retained are consistent with other templates with respect to position as opposed to curvature. Templates are updated periodically to purge those no longer capable of giving, satisfactory positional data. New templates selected from the current image are then used to replace those discarded. The position of each template is determined by comparing the template against the current image. The preferred comparison method uses an integer position search followed by a two-dimensional interpolation process to obtain positional information accurate to fractions of a pixel. A transform model is then calculated from the derived position data using additional data relating to the shape of the error surface near the matching position. The transform model provides a description of the current image so that indicia may be inserted into the current image in the desired location and correct perspective. There may be various forms for this transform model. For example, the simplest model defines the pan, tilt, and zoom of the camera recording the event. More complex models may include camera parameters such as roll, mounting offsets, and other camera motion. The transform model may be confirmed by examining pre-defined synthetic templates and the model can be adjusted if necessary. Changes in mis-match values over time allow video transitions such as scene cuts and fade-outs to be detected. Lastly, the system and method of the present invention is viable so long as there is texture in the current image. The texture need not be stationary, however, over periods longer than several frames of video, i.e. crowds. dr

BRIEF DESCRIPTION OF THE DRAWINGS

The present invention can be better understood with reference to the following figures in which like numerals shall represent like elements in the various figures.

FIGS. 2(*a*) and 2(*b*) illustrate two different image templates.

FIG. 5 illustrates three overlaid block mismatch functions with respect to position.

FIGS. 6(*a*)–(*c*) illustrate a two dimensional optimization method used for locating the error surface minimum.

FIGS. 10(*a*)–(*c*) illustrate the pan, tilt, and roll angles, focal length image size, and optic axis offset of a camera configuration.

DETAILED DESCRIPTION

Detection of an insertion target area is only one aspect of a complete insertion system. By way of background, an LVIS, or live video insertion system, is described in commonly owned application; Ser. No. 08/563,598 filed Nov. 28, 1995 entitled "SYSTEM AND METHOD FOR INSERTING STATIC AND DYNAMIC IMAGES INTO A LIVE VIDEO BROADCAST". An LVIS is a system and method for inserting static or dynamic images into a live video broadcast in a realistic fashion on a real time basis. Initially, natural landmarks in a scene suitable for subsequent detection and tracking are selected. Landmarks preferably comprise sharp, bold, and clear vertical, horizontal, diagonal or corner features within the scene visible to the video camera as it pans and zooms. Typically, at least three or more natural landmarks are selected. It is understood that the landmarks are distributed throughout the entire scene, such as a baseball park or a football stadium, and that the field of view of the camera at any instant is normally significantly smaller than the full scene that may be panned. The landmarks are often located outside of the destination point or area where the insert will be placed because the insert area is typically too small to include numerous identifiable landmarks and the insertable image may be a dynamic one and, therefore, it has no single, stationary target destination.

The system models the recognizable natural landmarks on a deformable two-dimensional grid. An arbitrary, non-landmark, reference point is chosen within the scene. The reference point is mathematically associated with the natural landmarks and is subsequently used to locate the insertion area.

Prior to the insertion process, artwork of the image to be inserted is adjusted for perspective, i.e., shape. Because the system knows the mathematical relationship between the landmarks in the scene, it can automatically determine the zoom factor and X, Y position adjustment that must be applied. Thereafter, when the camera zooms in and out and changes its field of view as it pans, the insertable image remains properly scaled and proportioned with respect to the other features in the field of view so that it looks natural to the home viewer. The system can pan into and out of a scene and have the insertable image naturally appear in the scene rather than "pop up" as has been the case with some prior art systems. The system can easily place an insertable image at any location.

Figure 1:
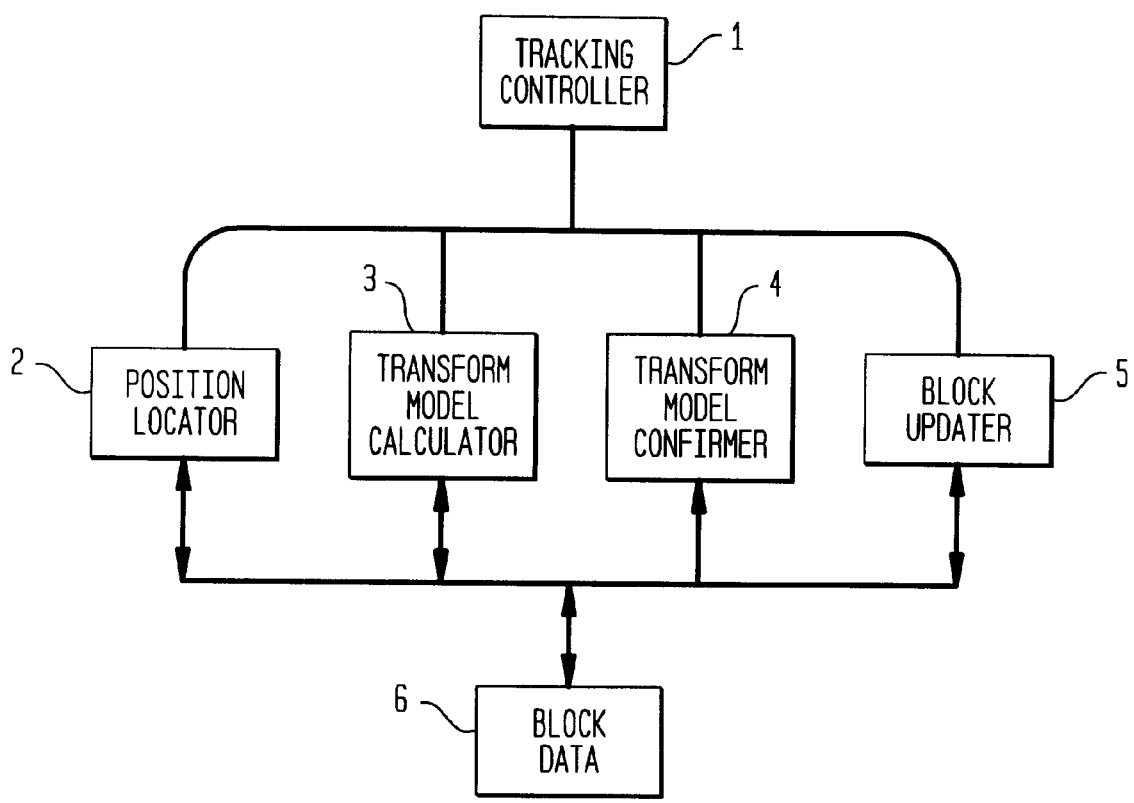
FIG. 1 illustrates a block diagram of the texture tracking system of the present invention.

The present invention relates to the tracking aspect of a live video insertion system. FIG. 1 illustrates a block diagram of a image texture tracking system of the present invention.

TRACKING CONTROLLER

A tracking controller 1 controls the operation and sequencing of four modules: a position locator 2, a transform model calculator 3, a transform model confirmer 4, and a block updater 5. Position locator 2 reads block data 6 and determines the positions of templates in the current image. Blocks comprise templates and associated data. Position locator 2 stores the current positions of the templates together with additional data in block data 6 once it has successfully located a template. Additional data includes data pertaining to how well a template matches the current image and how any mismatch varies with position. Transform model calculator 3 uses block data 6 to calculate a transform model. The transform model defines how a reference model must be changed in order to satisfactorily correspond to the current image. The reference model is a representation of a scene in a coordinate system independent of the current image coordinates. A camera model is a specific type of transform model expressed in terms of camera parameters only, e.g., pan, zoom, tilt, and roll. Transform model confirmer 4 ensures that the transform model is a visually correct description of the current image by looking for tracking errors as well as evidence of scene cuts and other digital video effects. Block updater 5 examines the blocks, purges memory of those no longer useful, and selects and stores replacement or new blocks. Each of the modules of FIG. 1 is normally activated once per field of interlaced video.

When an insertion target area is detected for the first time, tracking controller 1 activates block updater 5 to select and store blocks. The transform model derived from detection is used to relate the stored blocks to a reference model. These blocks are then used by position locator 2, model calculator 3, and model confirmer 4 in subsequent fields.

POSITION LOCATOR

Position locator 2 determines the position of stored templates with respect to the current image. Templates typically consist of a rectangular array of pixels. Good results have been obtained from arrays of 8×8 to 16×16 pixels. Larger sizes give better results if the motion is simple while smaller sizes give better results for complex motion.

There are two types of templates, image templates which are derived from an image and synthetic templates which are predefined and not derived from any particular image. Synthetic templates are typically zero-mean templates. Zero-mean templates are templates whose average illumination levels are zero. They may be derived from templates by subtracting the average illumination level from each pixel in the template. FIG. 2a illustrates a zero mean template intended for detection of vertical edges and FIG. 2b illustrates a contrived image template showing a collection of pixel illumination levels for an 8×8 array. Blocks consist of one or more templates along with associated data. There are two types of blocks, image blocks which contain image templates and synthetic blocks which contain synthetic templates. Synthetic blocks are typically related to lines in the reference model while image blocks are typically related to points in the reference model.

Time permitting, the positions of all stored templates with respect to the current image are determined by searching. Unless the search is exhaustive over a predefined area, the time taken for search cannot normally be predetermined and the tracking controller will normally set a time limit within which all searches must be completed. This time limit should allow for sufficient time for updating blocks. Generally, the time limits should be set so that the number of active blocks remaining after block updating can be adequately searched during subsequent fields. The number of blocks may vary as the video changes. Active blocks are those blocks that match the current image.

The position of each template is typically found by conducting a search over a limited region of the current image. An efficient way of searching is to perform matching at integer pixel positions using pre-selected block matching criteria. In order to obtain an accurate estimate of motion of the images, it is desirable to obtain an estimate of template position to sub-pixel accuracy. Sub-pixel accuracy is necessary for stability and accuracy of the transform model, particularly when only a small number of templates yield reliable position data. The search preferably takes place in two phases, an integer position search followed by a fractional pixel interpolation process.

For an integer position search, each template is positioned at several integer position positions in the current image and an error surface is calculated using the selected template capturing criteria. Normally, the minimum of the error surface is used as the integer position. If extensive computational resources are available, the search may be an exhaustive one over a large area. For greater efficiency, the local motion and position of the template may be predicted using recent history of the transform models together with the locations of any templates found in the current image. The estimated local motion vector is used to determine the size and shape of a region over which to perform the search. Since large motion vectors are likely to be less accurately predicted than small motion vectors, the size of the search region should increase as the magnitude of the vector increases. It is important to check the zero vector since replay or other video editing may perturb the predicted transform model. The zero vector represents no motion meaning the position of the template in the current image is identical to the position of the template in the previous image.

Prediction is important since it reduces computation time and can resolve positional ambiguities. For instance, if two equally good template locations are found then the template location closest to the predicted position is more likely to be the correct template location. Simple linear or second order prediction techniques are normally sufficient. Best results are obtained by predicting the camera motion rather than the image motion since cameras have physical inertia for pan and tilt, and zoom tends to be smooth. Note that video interlace can perturb simple field-to-field predictions and care should be taken to allow for this, either by using prediction schemes based on frames, or allowing for a video interlace offset. Also note that positional noise may be present due to camera vibration, and that during replay, or when the video has been edited, simple prediction models may not work. It is therefore important to allow for unpredictable behavior by continually checking for zero motion or by performing a wide search on a few selected blocks with templates having a well defined texture.

When tracking certain objects such as netting or fences, multiple error surface minima may be present. Such multiplicities can be resolved by prediction or by getting an initial estimate from those templates that exhibit only a single minimum. One way to choose from among multiple minima is to use a weighting function that places less emphasis on minima that are further from the predicted position and to select the best weighted minimum.

One method of conducting the integer position search is to exhaustively search a series of regions. The initial search region is centered on a predicted template position, and its size and shape depends on the local velocity of the pixels as estimated from predicted camera motion. If the minimum occurs at a border of the search region then a second search is done in a region which encloses the first minimum. When a minimum is found inside the predicted region, i.e. not on the boundary, the integer search terminates successfully. To avoid spending too much time on blocks which are likely to be in error, it is best to terminate the search after two or three steps. If a minimum is not found then this information is written into block data 6 so the block may be later purged by block updater 5.

Another option is to estimate the transform model as the template positions are progressively determined. As more reliable estimates are made, the search regions can be reduced in size and the number of permitted steps decreased.

Typical block matching criteria include L1 norm, L2 norm, and normalized correlation. L1 norm is defined as $D=\Sigma d$, L2 norm is defined as $\Sigma d^2$ where d is the difference in pixel values between the image and the template. The summation is carried out over all the pixels in each template. The normalized correlation is defined as:

$$N = \frac{\sum IT}{\sqrt{\sum I^2 \sum T^2}}$$

where T represents the pixel values in the image template and I represents the values in the current image.

In this description, block matching techniques will be defined so that the best match corresponds to the smallest value of the selected matching criteria. Thus, if normalized correlation were used as the block matching criteria the mismatch would be defined as:

$$M = 1 - N = 1 - \frac{\sum IT}{\sqrt{\sum I^2 \sum T^2}}$$

As the template is moved over the current image the resulting array of values calculated using the selected block matching criteria is called an error surface and the best match occurs when the error surface has a minimum value. The templates are a carefully selected subset of the total blocks available rather than all possible positions. Careful choice of a region and template is necessary because, unlike motion estimation in compression algorithms, the result of the present calculation is not a set of motion vectors for the blocks, but rather a single transform model. In a "least square error" sense the single transform model is the best descriptor of the motion of the template ensemble. Moreover, the templates are placed in selected positions in the image rather than tiling the image. Further, the templates are stored in memory and are not discarded after each image is processed.

In the present invention, the current position of a template is determined relative to this previous position whereas in motion estimation the previous position is determined relative to the current tiled position. Motion estimation in video encoding is directed toward finding the best displacement match, i.e. that with the smallest coding error, to the current image from a previously transmitted image. In contrast, position location of the present invention is directed toward the visual correctness (the viewer's perception of the image) of the motion of the image. In ambiguous cases it is not important how motion estimation resolves the ambiguity but it is important how the position location method of the present invention resolves the ambiguity. Resolution of the ambiguity may involve examination of the model as determined from other nearby blocks. Motion estimation has limited accuracy, often to ½ pixel, due to computational and coding requirements associated with increased accuracy. In position location, however, there are no such limits on accuracy.

After the integer position search terminates successfully, the fractional part of the motion vector is estimated. There are several ways of doing this.

Figure 3:
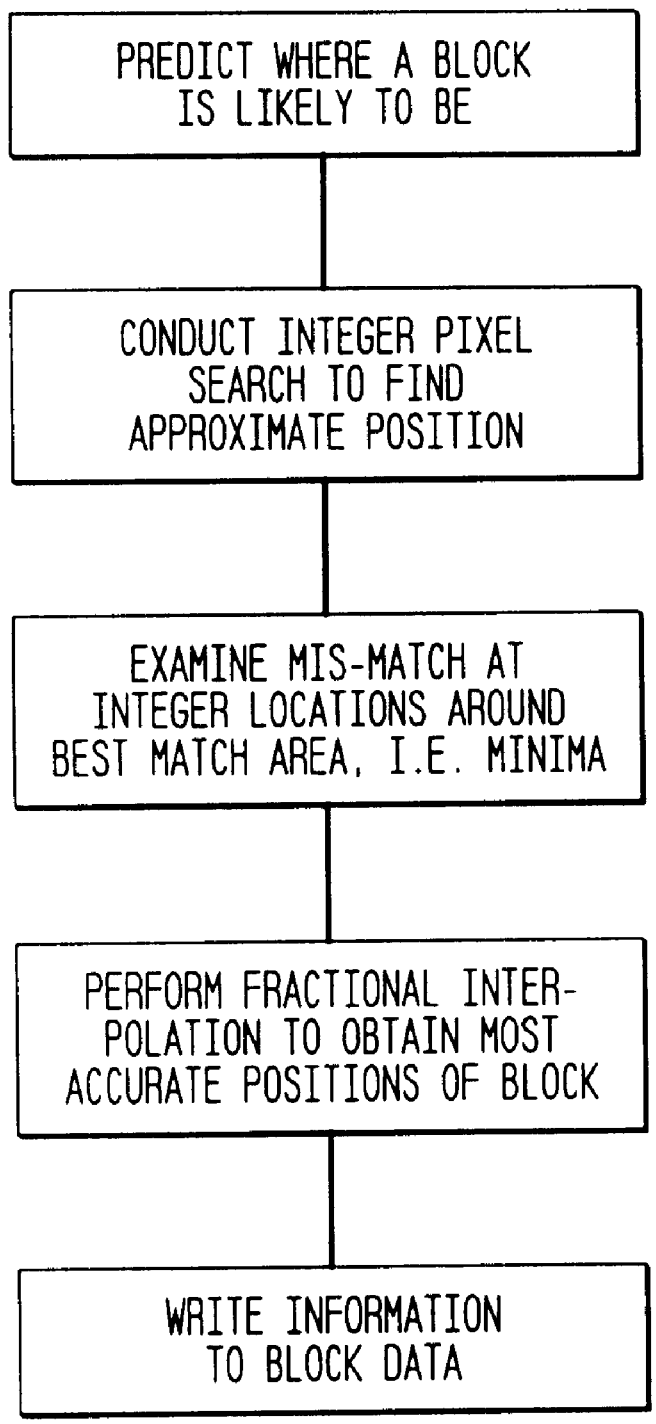
FIG. 3 is a block diagram of showing the functions of the position locator.

After the integer search terminates successfully, the fractional part of the motion vector is estimated. The numerical values of the mismatch near the integer minimum give an error surface. The shape of the error surface depends on both the block matching criteria, the template, and the current image. A preferred method uses L1 norm for integer search followed by trianglar interpolation for fractional estimation. One dimensional triangular interpolation is illustrated in FIG. 3. Lines of equal but opposite slope are constructed through the integer minimum 32 and the two adjacent points 31 and 33. Parabolic interpolation, which is also illustrated in FIG. 3, fits a parabola through the same three points. Parabolic interpolation lends itself to some two-dimensional interpolation methods, and is suitable for L2 norm block matching. Parabolic and triangular interpolation generally give different values for the position and magnitude of the minimum. Three halves power interpolation, which is intermediate between triangular and parabolic interpolation, can sometimes give better results. Use of additional points to fit a cubic or spline function is not worthwhile for the block matching functions described here.

Location of the error surface minimum requires a two-dimensional optimization method. Several such methods are available. The image template may be expanded to give values at sub-pixel positions and the integer position search applied to these sub pixel positions. A second method uses a sequence of one dimensional interpolations, and a third method is to fit a two dimensional surface directly to the error surface.

The first method is illustrated in FIGS. 6(*a*)–(*c*). The source pixels in FIG. 6(*a*) are spaced apart and the in between values filled in by, for example, bi-tinear interpolation as shown in FIG. 6(*b*). If the expansion is by a factor of n, the template pixels are matched against every nth expanded image pixel and the positional accuracy is 1/n pixel. The template shown in FIG. 6(*c*) matches the expanded image template if it is positioned ½ pixel to the right and ¼ pixel down with reference to FIG. 6(*a*). This method is computationally costly since $n^2$ matches must be made to get an accuracy of 1/n.

Figure 4:
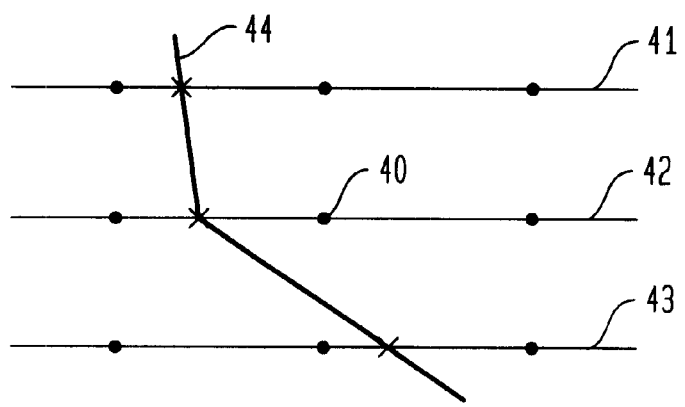
FIG. 4 illustrates a two-dimensional interpolation method used in the present invention.

The second method is illustrated in FIG. 4. It uses the error surface values near the minimum found by integer position search 40. Minima are interpolated for horizontal scan lines above 41, at 42, and below 43 the integer minimum, using a one-dimensional interpolation method. The final minimum is interpolated from these three minima 44. Note that for a large class of mathematically modeled two dimensional surfaces, this technique yields perfectly accurate interpolated positions.

The curvatures of the error surface are also estimated. If the template defines a horizontal and vertical edge, or a textured structure, then the horizontal and vertical curvatures should be estimated. A simple estimation is an (A−2B+C) representation where B is the value of the error surface at the minimum and A and C are values equidistant from the minimum on each side. For parabolic interpolation the positions of the measurements are not critical, so it may be computationally convenient to use the integer position values. For other interpolation methods, e.g. triangular, the position is important, and the interpolated values might be used instead. If the template defines a diagonal edge, then the curvature perpendicular to the edge should be measured. The measured or estimated curvatures contribute to the block weighting used by model calculator 3.

Block matching may be performed by any of the previously mentioned techniques, e.g. L1 norm, L2 norm, or normalized correlation. L1 norm is computationally the simplest. In video coding it is normal to measure only the luma component of the image for motion estimation. Although luma usually contains most of the high spatial frequency information, the chroma components may provide additional information, particularly useful in resolving positional ambiguities. Block mismatch functions can be adjusted to incorporate chroma information. In all matches, the values are summed for the particular color space using weights to combine the color planes. In Y, U, and V color space and other similar color spaces, the luma component normally contains most of the high spatial frequency information and is the most important component for positional matching.

A third method for finding the two-dimensional position of the minimum of the error surface is to assume the error surface has a particular shape near the minimum and interpolate the position of the minimum using a singular value decomposition method such as described in "Numerical Recipes in C" $2^{nd}$. Ed., W. H. Press et al., Cambridge University Press, 1992, p. 59. The shape could be a second degree surface, an elliptical cone, or other shape.

Care must be taken in applying two dimensional minimization methods since diagonal edges can result in positions that are very susceptible to pixel measurement noise. It is recommended that the minimum found by interpolation methods not be allowed to deviate by more than a pixel from the position indicated by the integer search.

A problem with simple interpolation methods, however, is that they do not account for intrinsic asymmetry of the error surface. Appendix A-2 illustrates the source of the intrinsic asymmetry. The preferred way to achieve a more accurate estimation is to do an interpolation of the error surface found using the original image, i.e. the image from which the template was extracted, and measure the offset. This can become part of the reference position. Another method is to measure the shape of the error surface using the original image, and then calculate the position of the minimum based on deviations from this shape rather than the measured shape in subsequent images.

In order to extend the search range without incurring a large computational penalty, a multi-resolution search may be employed. The image is first low-pass filtered and subsampled to provide a series of lower resolution images. Blocks, or sets, of images are saved at each resolution level. Searching and block matching are performed at each resolution level, starting with the lowest resolution level. A transform model is calculated for each resolution level and used to predict the block positions for the next highest resolution level. This process reduces the search range at each resolution level. The transform model is refined at each resolution level and the final transform model is obtained at the highest resolution level. In some cases, e.g., rapid camera motion which blurs image details, it may not be possible to calculate an accurate transform model at the highest resolution level. In such cases the transform model calculated at a lower resolution level can and should be used.

TRANSFORM MODEL CALCULATOR

A reference model is a representation of an image in a coordinate system that is independent of the current image coordinates. A transform model defines the way in which the reference model must be changed in order to correspond to the current image. Simple transform models use three parameters: zoom, horizontal shift and vertical shift. More complete transform models use more camera parameters. These camera parameters include pan, tilt, roll, zoom, and focal length.

The camera models account for perspective changes in the scene. More complex transform models may account for additional changes such as camera mount offsets, 30 lens distortions, and lighting variations. A camera model is illustrated in FIGS. 10(*a*)–(*c*) which shows how a camera may be defined in terms of pan, tilt, and roll angles together with focal length, image size, and optic axis offset.

Various techniques may be used to calculate the transform model. The preferred technique is a mean square error method which seeks to minimize the mean square error of a mismatch function. A useful addition to this technique is to dynamically vary the weights for the block positions. This reduces the effect of outliers below that of mean square methods. Outliers are those blocks which have a position differing significantly from that determined by the majority of the blocks. Dynamically varying the weights is important since blocks may be in error due to systematic image content rather than random noise which is assumed by many mean square error methods. The preferred method first sets horizontal and vertical weights for each block depending on the corresponding curvatures of the error surface. It then calculates a preliminary transform model using the mean square error minimization method. Each block is evaluated to determine how well it agrees with the preliminary transform model. Block weights are then modified depending on the spatial error. The final model is calculated using the modified weights. This two-step technique reduces or eliminates the effect of outliers. One way to calculate the transform model is given in appendix A-4.

TRANSFORM MODEL CONFIRMER

Figures 9A, 9B, 9C:
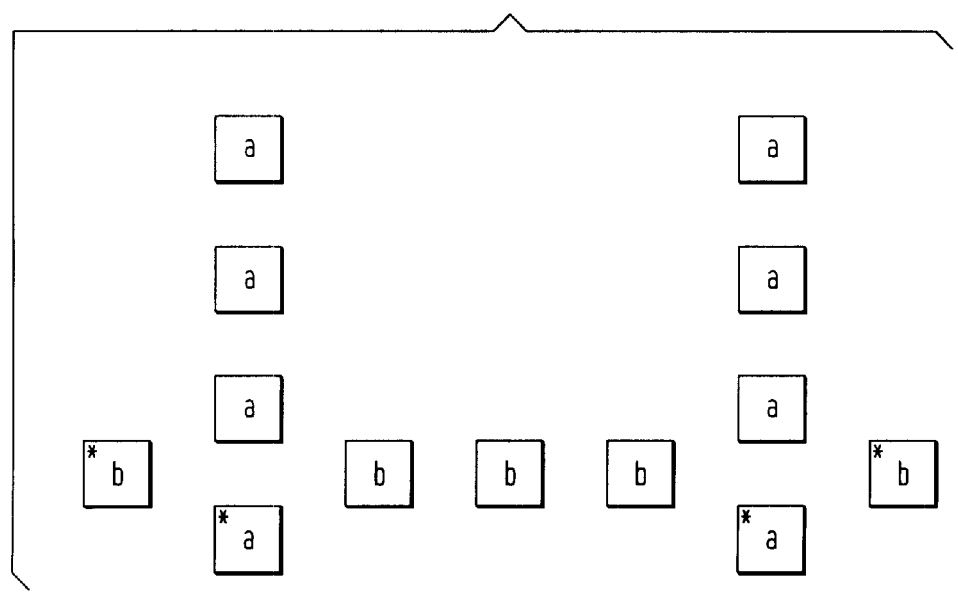
FIGS. 9(*a*)–(*c*) illustrate a vertical template, horizontal template, and an arrangement of these templates used to locate a football goal post.

Confirmation of the transform model is performed by examining synthetic or predefined blocks. For example, if a football goalpost is known to be lighter that the background then it can be detected using the templates of FIG. 9(*a*) for the uprights and FIG. 9(*b*) for the horizontal crossbar as arranged in FIG. 9(*c*). The block matching method for the zero mean templates would be maximizing the sum of the product of the template pixels and the image pixels and the image pixels. In order to confirm the pressure of a goal post as opposed to some other image feature consisting of intersecting lines. The templates marked with an asterisk in FIG. 9(*c*) must not give a positive correlation, i.e. the horizontal must not extend outside the uprights and the vertical must not extend below the crossbar. If a sufficient number of such blocks are active and giving reliable positional information, a separate transform model may be calculated from these blocks and used to partially adjust the main transform model. If only a few are visible then the adjustment should be small so as not to unduly perturb the transform model. If predefined blocks cannot be found, or if mismatches are of increasing amplitude, then a scene cut may have occurred, or a wipe or fade may be in progress. A detailed evaluation of predefined blocks together with recent history of the image blocks allows a determination of scene transition.

If the mismatch occurs in nearly all templates and is progressively increasing, then a fade is indicated. If a mismatch occurs along a boundary line dividing the image, then a wipe is indicated. The problem of reliably detecting scene transitions is simplified if it is known a priori what types of transitions can occur. The problem of detecting an unknown transition is difficult since such transitions can mimic changes that take place in a continuous shot.

Note that scene transition information might be made available by means of a separate signal, perhaps incorporated in the vertical blanking interval, or encoded within the image itself.

An estimate of the reliability of the transform model may be used during this confirmation step. Less reliable transform models may require more extensive confirmation. Reliability may be estimated from the sum of the weights as calculated by the transform model calculator., This sum takes into account the number of blocks, their texture or curvature of the error surface, and the mismatch from the transform model.

Once the transform model has been found and confirmed, insertion may be completed using the methods described in U.S. Pat. No. 5,264,933 or the method described in co-pending application 08/entitled "Tapestry".

BLOCK UPDATER

Blocks are periodically examined in order to determine whether they should be retained. Block updating is preferably done in either the odd only fields or even only fields in order to reduce video interlace stability problems. In the preferred embodiment updating is done on even tracking fields counting the first tracking field as zero.

There are two steps in the block updating procedure, purging old blocks and assigning new blocks.

The first step of the block updating procedure is to purge blocks that do not meet the template retention criteria. In order to be retained for further use each stored block must typically satisfy the following retention criteria:

The stored block must be in the image safe area (e.g. not in the horizontal blanking area)

The stored block must not be in an active image bum-in region (e.g. not overlapping on-screen graphics)

The stored block's position must agree with the current transform model

The stored block must have sufficient curvature of the error surface.

There may be some additional application specific retention criteria. For example, in tracking a grass playing field the template may only overlap grass and not players.

The second step of the block updating procedure is to assign or extract new blocks. Blocks are first assigned to predefined positions in the reference model then to random positions in a search area in the reference model as transformed to the image.

It is important to always complete the first step in the updating procedure so that invalid blocks are eliminated. The second step may be terminated when time expires or when a sufficient number of templates have been captured. This procedure dynamically adjusts the number of stored blocks to match.

Image templates are copied from the image, optionally processed, and stored in a memory. The number of templates extracted may depend on the processing time available.

For purposes of extraction, image blocks may be divided into two types, point blocks and area blocks. Point blocks have predefined positions in the reference image. One example of a point block could be the corner of a football goal post. A template is assigned to the image position closest to that calculated from the reference model using the transform model. If it meets the criteria for successful storage, its actual position in the reference model is stored. This will deviate from the reference position by an amount less than half an image pixel calculated using the transform model for the image from which it was copied. Area blocks are randomly assigned within a search area in the reference model. If they meet the criteria for successful storage, their actual positions in the reference model are stored.

In order to make efficient use of the available processing resources, each extracted template must satisfy certain template capturing criteria. Its position must be in the safe area, i.e., each extracted template must be away from the edges of the image, and, in particular, away from any darkening or other effects due to video blanking. Moreover, each extracted template must be in the search area, i.e., in an area known to the controller based on previous analysis. For example, templates in a stadium may be captured from the stands or from stadium structures rather than the playing field in order to avoid spatial perturbations due to the motion of players. Each extracted template must be predicted not to leave these areas, the prediction being based on recent history of camera motion. Further, each extracted template must not be in any exclusion areas, e.g. a burn-in area which is showing an on-screen message independent of the source video, and should be predicted to avoid these areas in the near future. Lastly, each extracted template should not overlap any other existing templates for efficiency, although a slight overlap may be allowed. It must possess sufficient texture for the selected block-matching criteria to work. The texture may be determined by one of a number of means, e.g. measuring the luma variation, or applying the template to the source image and measuring the shape of the error surface. If all these conditions are satisfied, then the image template is extracted.

In certain situations there may be additional template capturing constraints on the templates. These may relate to the color or texture of the image itself. For example, if it is desired to track a red object, then all templates must include some red pixels. For another example, if it is desired to track the grass surface of a playing field, then templates should exclude regions that contain nonrass colors in order to exclude the players. Grass may be defined as a certain volume in three dimensional color space. An additional calculation would allow the inclusion of the playing field lines in the templates.

Templates may be processed in a number of ways. They may be filtered to reduce noise and other artifacts, but this may have the unwanted effect of reducing the spatial accuracy of the match. They may be compared with previously captured templates in the same area and averaged to reduce noise. They may be adjusted for zoom or perspective variations based on the calculated camera actions.

Instead of copying a new template from the current image, inactive blocks may be reactivated by retrieving templates from memory and matching them to the current image. They may be matched directly, or changed in magnification, shape or brightness or otherwise, in order to match the current transform model and image illumination. This has the advantage of increasing long term stability.

The shape of the template surface is important. The directions and values of maximum and minimum curvature should be determined so that it can be determined if the template represents a horizontal or vertical edge, or has a two-dimensional structure. One way to do this is to use the block matching to generate an error surface for the source image. The curvature of the error surface indicates the type of image feature. Some methods of calculating the transform model do not recognize diagonal edges, and the presence of such edges can reduce the accuracy of the model. On the other hand, such templates will be purged when they give an incorrect position and have no long term effect on the accuracy of the transform model. However, for scenes where diagonal lines form an important part of the spatial locating information, e.g. for tennis courts, diagonal lines should be recognized and used to provide positional information only in a perpendicular direction.

Figure 7:
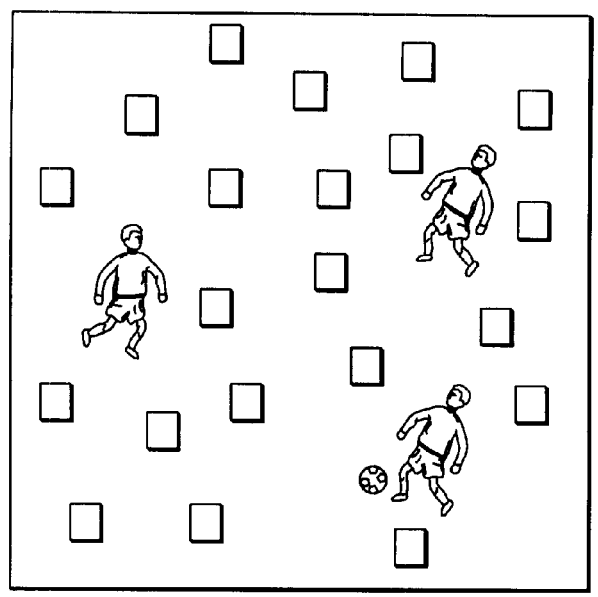
FIG. 7 illustrates spatial selection of blocks in an image, specifically for a soccer match.

FIG. 7 illustrates selection of blocks for tracking the motion of a soccer field. The blocks are selected so that the entire block plus a safety region around each block consists entirely of the playing surface, in this case grass. Grass is defined by a certain volumetric shape in three dimensional color space. If any pixel lies outside this region the block is rejected.

Figure 8:
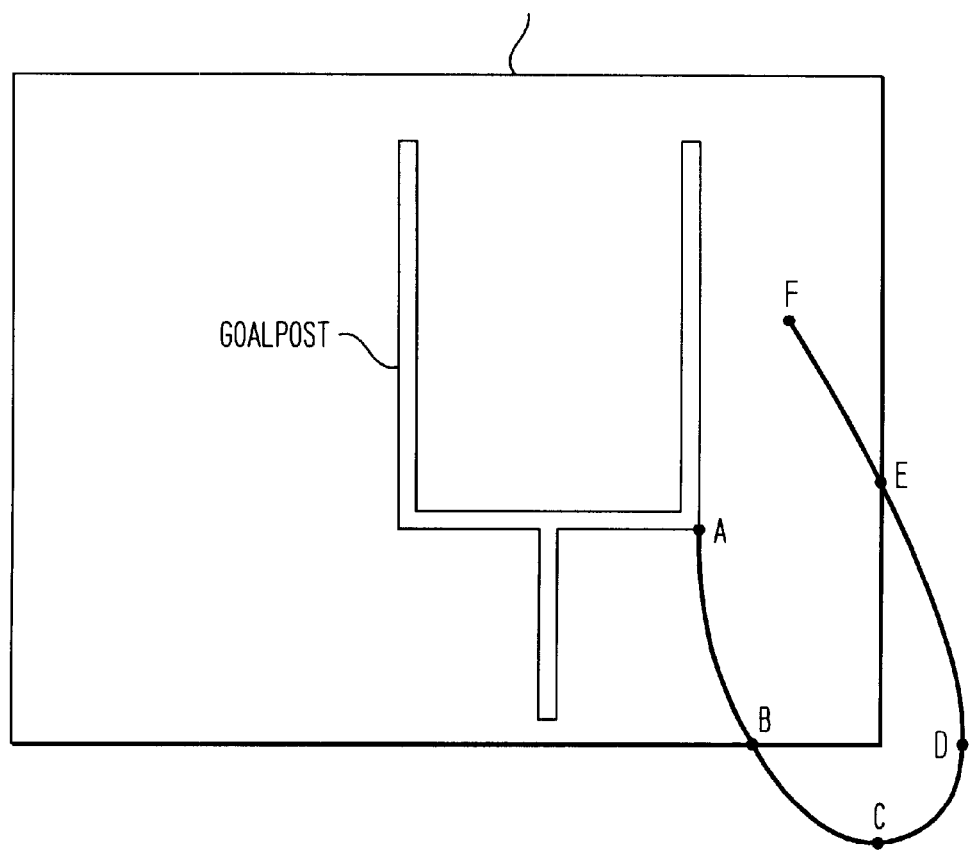
FIG. 8 illustrates a typical image and camera trajectory A-B-C-D-E-F.

FIG. 8 illustrates the tracking procedure as camera pan and tilt change. For simplicity, it is assumed that the lighting and the zoom are constant. The bottom right corner of the goal post is assumed to follow the trajectory A-B-C-D-E-F relative to the image outline. During the trajectory from A to B, tracking is performed using a mix of predefined and image texture blocks. A full model confirmation based on the size and shape of the goal posts is possible. At point B, the horizontal crossbar disappears from view. A full model confirmation is no longer possible but zoom and pan can still be calculated from the landmark blocks alone. The blocks that were on the crossbar are reassigned to other parts of the image. From B to C tracking continues using the stored blocks. At point C the right upright disappears from view and the blocks associated with it are reassigned. At point D the horizontal crossbar is predicted to reappear, and a search is conducted using the landmark blocks. After the crossbar is located, any discrepancies in the model are slowly resolved so as not to disturb the insert location. At point E the right upright becomes visible, and, between E and F, full model confirmation is again possible.

During tracking, area blocks tend to migrate to that area of the image which most accurately defines the transform model. For example assume that a scene cut occurs to an insertion scene where large foreground objects are visible. Area blocks will be randomly assigned to both foreground and background. Unless the foreground has the majority of blocks and moves with internal consistency, the transform model will be defined by the background. As soon as part of the foreground moves relative to the background, any blocks assigned to it will be inconsistent with the transform model and will be purged then randomly reassigned, eventually ending up on the background. Block migration increases the stability of the insertion position.

Another type of block migration, between types of blocks, is illustrated by a typical clay court tennis match. At the beginning of the match the court lines are clear and well marked, and the court surface is smooth. The lines will be covered by synthetic blocks, and there will be few image blocks on the court surface. During the match, the lines typically become obscured and the court surface becomes rougher and gains texture. The synthetic blocks are progressively purged and image blocks progressively added to the court.

Blocks may be purged, but the template stored for possible future use. For example, if the zoom has changed so that a template no longer provides a good match, a new template may be captured and the old one placed in a long-term storage. At some future time, the zoom may return to its former value, in which case the old template may be retrieved and tested to see whether it can provide a useful match.

APPENDICES

Four appendices have been included herewith further describing and illustrating certain aspects of the present invention. Appendix A-1 is a comparison of selected block matching criteria against possible current image blocks. Appendix A-2 is a more detailed description of a one dimensional fractional estimation illustrating the source of asymmetry of a surface associated with simple interpolation methods. Appendix A-3 is a glossary of terms used throughout the text of this document. Lastly, appendix A-4 is a specific method for calculating an optimum three parameter non-perspective tracking model from the measurement of derived image templates.

APPENDICES
APPENDIX A-1 A COMPARISON OF SOME BLOCK MATCHING CRITERIA

Consider matching the following 2 × 2 template block
1 2
4 1
to the following image blocks:

| 1 3 | 9 21 | 30 30 |
| 4 1 | 39 11 | 30 30 |
| A | B | C |

The best match is to block A which differs in only one level in one pixel. Block B has a similar shape, but a much higher amplitude, and block C is uniform. Matches are evaluated using the following criteria methodologies:

L1=L1 norm

L2=L2 norm $BA = 2\Sigma IT/(\Sigma I^2 + \Sigma T^2)$.

NC=normalized correlation

TI=$\Sigma IT$

ZI=$\Sigma IZ$ where Z are the zero mean pixel values of the template as shown below:
−1 0
2 −1

Note that the value of the top right pixel in the image has no effect whatsoever on ZI suggesting that this is a poor matching criteria method since multiplying by zero yields a null value for that pixel location.

The results of the various matching criteria are shown in the following table where an asterisk (*) marks the best match.

| CRITERIA | A | B | C |
|---|---|---|---|
| L1 min | 1* | 72 | 112 |
| L2 min | 1* | 1750 | 3142 |
| BA max | 0.9796* | 0.1325 | 0.1995 |

-continued

| CRITERIA | A | B | C |
|---|---|---|---|
| NC max | 0.9847 | 0.9991* | 0.8528 |
| TI max | 24 | 218 | 240* |
| ZI max | 6 | 58* | 0 |

It can be seen that the first three criteria methods, L1, L2 and BA, work well. Normalized correlation (NC) has some potential problems, but in real images the chances of finding an image block with the same shape but different amplitude are small. TI and ZI are not recommended since there are many possible image blocks that give a higher score than a perfectly matched one.

APPENDIX A-2. One-Dimensional Fractional Estimation

Shape of Interpolation

Consider matching the 6-element template block 1 1 1 2 2 2 to an image containing a corresponding sharp edge: . . . 1 1 1 1 2 2 2 2 . . . The block mismatch functions for various criteria are given below:

| NC | .949 | .947 | .969 | 1.00 | .974 | .958 | .949 |
|---|---|---|---|---|---|---|---|
| L1 | 3 | 2 | 1 | 0 | 1 | 2 | 3 |
| L2 | 3 | 2 | 1 | 0 | 1 | 2 | 3 | where NC means Normalized Correlation, L1 means L1 norm and L2 means L2 norm. Both L1 and L2 have a triangular shape. Normalized correlation has an asymmetric shape which is more peaked than triangular.

Consider matching the 6-element template block 1 1 2 3 4 4 to an image containing a corresponding soft edge: . . . 1 1 1 2 3 4 4 4 . . . The block mismatch functions for various criteria are given below:

| NC | .924 | .955 | .980 | 1.00 | .982 | .948 | .912 |
|---|---|---|---|---|---|---|---|
| L1 | 9 | 6 | 3 | 0 | 3 | 6 | 9 |
| L2 | 19 | 10 | 3 | 0 | 3 | 10 | 19 |

L1 has a triangular shape. L2 has a shape that is close to parabolic. Normalized correlation has an asymmetric shape which is between a triangle and a parabola.

Moving Lines

Consider matching the 4-element template block 2 2 4 4 to an image: 2 2 2 4 4 2

| NC | .956 | 1.00 | .900 |
|---|---|---|---|
| L1 | 1 | 0 | 2 |

Parabolic interpolation of the maximum using normalized correlation gives a maximum at 0.194 pixels to the left of the correct central position. Interpolation of the minimum using L1 gives 0.167 pixels to the left. Triangular interpolation of the maximum using normalized correlation gives a maximum at 0.280 pixels to the left of the correct central position. Triangular interpolation of the minimum using L1 gives 0.250 pixels to the left.

This shows that, in general, interpolation using normalized correlation or L1 yields only approximate positions of the best match.

Shifting the image 0.5 pixel to the right gives 2 2 2 3 4 3

| NC | .9661 | .9909 | .9747 |
|---|---|---|---|
| L1 | 3 | 1 | 2 |

Parabolic interpolation of the maximum using normalized correlation gives a maximum at 0.105 pixels to the right of the central position. Parabolic interpolation of the minimum using L1 gives 0.167 pixels to the right. Triangular interpolation of the maximum using normalized correlation gives a maximum at 0.173 pixels to the right of the central position. Triangular interpolation of the minimum using L1 gives 0.25 pixels to the right.

Parabolic interpolation using normalized correlation gives a right shift of 0.299 pixels, using L1 gives a shift of 0.333 pixels, both less than the correct value of 0.5 pixels. Triangular interpolation using normalized correlation gives a right shift of 0.453 pixels, using L1 gives a shift of 0.5 pixels, both much closer to the correct value.

Moving Large Edges:

Consider matching the 4-element template block 1 1 3 3 to an image: 1 1 1 3 3 3

| NC | .904 | 1.00 | .930 |
|---|---|---|---|
| L1 | 2 | 0 | 2 |

Using normalized correlation parabolic interpolation of the maximum gives a maximum at 0.078 pixels to the right: of the correct central position. Using L1 both parabolic and triangular interpolation give the correct position.

Shifting the image 0.5 pixel to the right gives 1 1 1 2 3 3 3

| NC | .9297 | .9815 | .9556 | .9237 |
|---|---|---|---|---|
| L1 | 3 | 1 | 1 | 3 |

Using normalized correlation parabolic interpolation of the minimum gives a maximum at 0.167 pixels to the right of the central position. In other words, moving the edge 0.5 pixel shifts the position of the interpolated point by only 0.089 pixel. Using L1 both parabolic and triangular interpolation give the correct position Moving small edges Consider matching the 4-element template block 4 4 6 6 to an image: 4 4 4 6 6 6

The three normalized correlation values are:

| NC | .9843 | 1.000 | .9863 |
|---|---|---|---|
| L1 | 2 | 0 | 2 |

Parabolic interpolation of the minimum gives a maximum at 0.034 pixels to the right of the correct central position. L1 gives the correct position.

Shifting the image 0.5 pixel to the right gives 4 4 4 5 6 6 6

| | | | | |
|---|---|---|---|---|
| NC | .9870 | .9965 | .9962 | .9863 |
| L1 | 3 | 1 | 1 | 3 |

Parabolic interpolation of the minimum gives a maximum at 0.469 pixels to the right of the central position. In other words, moving the edge 0.5 pixel shifts the position of the interpolated point by 0.435 pixel. L1 gives the correct position.

This shows that for well defined edges L1 norm gives a better estimation of fractional interpolation than normalized correlation.

APPENDIX A-3 GLOSSARY OF TERMS active block those blocks that meet and are within specified matching criteria with respect to the current image affine model a transform model expressed by linear operations area block an image block that is preassigned to an area in the reference model background that part of a scene which remains stationary with respect to the camera support block one or more templates plus associated data containing positional information for the reference model and the current image model camera model a transform model which is expressed by camera parameters only, e.g. pan, tilt, zoom, and roll error surface a two dimensional array of values indicating the mismatch between a template and a part of the current image foreground that part of a scene which moves with respect to the camera support image block a block containing an image template image template a template derived from an image image texture a measure of pixel to pixel variations with respect to illumination levels Local motion vector the apparent visual motion of a small piece of the image from one frame or field to the next minimum the point where the error surface is at its smallest indicating the best match between a template and the current image point block an image block that is pre-assigned to a specific point in the reference model reference model a representation of the object scene is a coordinate system that is independent of the image coordinates synthetic block a block containing a synthetic template synthetic a predefined template not derived from any particular image since neither template the average illumination level nor the magnification of an image is known, synthetic templates are often zero-mean edge templates template an array of pixels texture tracking the tracking of image using templates copied from the image and used according to the method described herein transform model defines the way in which the reference model must be changed in order to correspond to the current image

APPENDIX A-4 ESTIMATING THE TRACKING MODEL

A method of calculating the optimum three-parameter non-perspective tracking model from the measurement of an image template is derived. The conditions under which the weighted means square derivation can generate the "wrong" model are analyzed. A method for calculating the model which avoids this problem is developed.

The transform model calculation problem may be stated as follows: given a reference model containing a set of points P and a current image containing a set of matching points p, what is the best estimate of the transform model? The standard approach is to minimize some function of the displacement errors. A convenient measure is the weighted mean square error. The weights may be based on the displacement errors predicted from past fields, and from the other points in the live field. The weights should also incorporate some measure of the reliability or accuracy of the positional measurement. For simplicity this appendix considers only displacement errors. It considers only a three-parameter transform model consisting of zoom, horizontal shift and vertical shift.

Model Definition

The transform model is defined in terms of three parameters: zoom z, horizontal shift u, and vertical shift v. If the reference image has a set of points X,Y then the corresponding current image points x,y are given by:

$$x = zX + u \tag{1}$$

$$y = zY + v \tag{2}$$

inversion yields:

$$X = (x-u)/z \tag{3}$$

$$Y = (y-v)/z \tag{4}$$

MSE Equations

The total square error of the transform is $$E = \sum_i w_{xi}(x_i - zX_i - u)^2 + \sum_i w_{yi}(y_i - zY_i - v)^2$$

where $w_{xi}$ is the weight associated with horizontal shifts of the $i^{th}$ point, and $w_{yi}$ is the weight associated with vertical shifts of the $i^{th}$ point. One reason for needing different weights is that the vertical direction in a field has interlace aliasing whereas the horizontal direction does not.

At the optimum position:

$$\frac{\partial E}{\partial z} = -2\sum_i w_{xi}(x_i - zX_i - u)X_i - 2\sum_i w_{yi}(y_i - zY_i - v)Y_i = 0 \tag{5}$$

$$\therefore z\sum_i (w_{xi}X_i^2 + w_{yi}Y_i^2) + u\sum_i w_{xi}X_i + v\sum_i w_{yi}Y_i - \sum_i (w_{xi}x_iX_i + w_{yi}y_iY_i) = 0$$

$$\frac{\partial E}{\partial u} = -2\sum_i w_{xi}(x_i - zX_i - u) = 0 \tag{6}$$

$$\therefore z\sum_i w_{xi}X_i + u\sum_i w_{xi} - \sum_i w_{xi}x_i = 0$$

$$\frac{\partial E}{\partial v} = -2\sum_i w_{yi}(y_i - zY_i - v) = 0 \tag{7}$$

$$\therefore z\sum_i w_{yi}Y_i + v\sum_i w_{yi} - \sum_i w_{yi}y_i = 0$$

Solving equations 5, 6 and 7 gives:

$$z = \frac{\sum_i w_{xi} \sum_i w_{yi} \sum_i (w_{xi}x_i X_i + w_{yi}y_i Y_i) - \sum_i w_{xi}x_i \sum_i w_{xi}X_i \sum_i w_{yi} - \sum_i w_{xi} \sum_i w_{yi}y_i \sum_i w_{yi}Y_i}{\sum_i w_{xi} \sum_i w_{yi} \sum_i (w_{xi}X_i^2 + w_{yi}Y_i^2) - \left(\sum_i w_{xi}X_i\right)^2 \sum_i w_{yi} - \sum_i w_{xi}\left(\sum_i w_{yi}Y_i\right)^2} \quad (8)$$

$$u = \left(\sum_i w_{xi}x_i - z\sum_i w_{xi}X_i\right) \Big/ \sum_i w_{xi} \quad (9)$$

$$v = \left(\sum_i w_{yi}y_i - z\sum_i w_{yi}Y_i\right) \Big/ \sum_i w_{yi} \quad (10)$$

Equations 8, 9 and 10 allow the model to be calculated directly from the current image points.

Weighting Function

The weighting function due to displacement error should have the following characteristics:

- positive and negative displacements should contribute equally to the weight,
- for small displacements the weighting function should be unity,
- for large displacements, where the point is obviously in error, the weight should be zero, and
- there should be a smooth transition for intermediate displacements.

Many weighting functions meeting these criteria are possible. The preferred function is defined as $$W = \frac{1}{1 + Gd^2} \quad (14)$$

where G is the weighting constant and d is the distance between the predicted and measured positions.

The optimum position can be found by an iterative procedure: starting with an initial position or an initial set of weights, new positions and weights are calculated alternately. The starting conditions may be derived from previous fields. As the iterations proceed, those points which are outliers and thus have small weights, could be reexamined to determine if a valid point close to the predicted point can be found. For example, an object next to the desired point may initially be mistaken for the desired point but as the positional estimations are refined, it may be possible to detect the correct point by searching a small region around the predicted position.

The iterative procedure may converge to an optimum which depends on the starting conditions and on G. When G is sufficiently small there is a single optimum. When G is large there are often many optima. Some are stable, i.e. a small change is restored by the iterative procedure, and some are unstable, i.e. a small change leads to a new optimum.

To avoid getting trapped in a local optimum in which only a small number of points have significant weights, the iterative procedure should start with unit weights. The result can then be compared with that starting from a prediction from past fields. If the results agree within the error of measurement a filtered predicted value may be used for the model. If the results differ significantly, then that based on the live field should be used since the difference may be due to an unpredictable change.

Critical Values of Weighting Constant

The transition between one and more-than-one optimum occurs at the critical value of G. The critical value depends upon the displacement of the image points. Critical values of G will be calculated for a simple, but important, case. Assume the reference image consists of a set of points along a straight line. Without loss of generality this is assumed to be vertical. Assume that in the live image a fraction r of the points are displaced horizontally by a distance H, perhaps due to a nearby object. If G is small then there is one optimum, whereas if G is large there will be two stable optima, one near the line and one near the object. There will be an additional unstable optimum between these two.

Assume that the line in the reference image is at X=0 then equation 9 simplifies to:

$$x = \sum_i w_{xi}x_i \Big/ \sum_i w_{xi}$$

Adding weights from equation 14 gives:

$$x = \frac{\frac{rH}{1+G(H-x)^2}}{\frac{1-r}{1+Gx^2} + \frac{r}{1+G(H-x)^2}}$$

This equation may be rewritten as a cubic:

$$Gx^3 - (2-r)\,GHx^2 + (1+(1-r)\,GH^2)x - rH = e \quad (15)$$

Equation 15 has been expressed in terms of the residual error e. Optimum positions correspond to e=0. This equation may be rewritten by introducing the dimensionless variables J and s:

$$J = GH^2 \quad (16)$$

$$s = x/H \quad (17)$$

$$Js^3 - (2-r)\,Js^2 + (1+(1-r)\,J)s - r = e \quad (18)$$

When J is small the optimum position s=r. This single optimum is stable. This is equivalent to saying that the optimum unweighted position of the line is the arithmetic average of the measured live image points.

When r=0.5 an optimum always exists at s=0.5. When J is small this is a stable optimum. When J is large this optimum is unstable and two stable optima exist for large and smaller values of s. The critical value of J may be calculated by differentiating equation 18 with respect to s then setting the value equal to 0 at s=0.5. The critical value of J found by this method is 4.

For smaller values of r the critical value may be calculated as follows. Differentiating equation 18 and equating to 0 gives the stationary points:

$$s = (2 - r \pm \sqrt{1 - r + r^{2-3/J}})/3 \quad (19)$$

This may be substituted into equation 18 putting e=0 to give an equation for J and r. For a given r the new equation may be solved numerically to find the critical value of 3. If r<0.5 the upper stationary point should be used to determine the critical value. Using this method yields the following critical values:

| r | 3 |
| --- | --- |
| 1/2 | 4.0 |
| 1/3 | 21.5 |
| 1/4 | 45.7 |
| 1/6 | 118 |
| 1/10 | 358 |
| 1/20 | 1518 |

In the first two simulations that follow, a line of 6 points has one point offset by 10 pixels. From the table above, the critical value of J is 118. From equation 16 the critical weight is $G=J/H^2=1.18$. Smaller values of G give a single optimum and larger values give two stable optima.

To select a value of G for a tracking application, several approaches could be taken. One of the simplest is to assume the measurement accuracy is H pixels. Given two points of greater separation the optimum should favor one or the other. Thus, if H were 2 pixels, G would be 1.0.

It is to be understood that the foregoing disclosure is illustrative of the present invention. Modifications may readily be devised by those ordinarily skilled in the art without departing from the spirit or scope of the present invention.

What is claimed is:

1. A method for tracking motion in a stream of video images comprising the steps of:
    a) obtaining a set of image templates (block) from a current video image that meet certain template capturing criteria and storing said image templates in memory;
    b) determining the position of each stored image template with respect to the current image;
    c) calculating a transform model using the determined template positions with respect to the current image, said transform model being a descriptor of the change of position of said set of image templates;
    d) purging image templates from memory that do not meet certain template retention criteria; and
    e) obtaining new image templates from said current image to replace the image templates that were purged, wherein said set of image templates comprises an array of adjacent pixels from a current video image and wherein said image templates comprise substantially less than all of the pixels in said current video image.

2. A method for tracking motion in a stream of video images comprising the steps of:
    a) obtaining a set of image templates (block) from a current video image that meet certain template capturing criteria and storing said image templates in memory;
    b) determining the position of each stored image template with respect to the current image;
    c) calculating a transform model using the determined template positions with respect to the current image, said transform model being a descriptor of the change of position of said set of image templates;
    d) purging image templates from memory that do not meet certain template retention criteria; and
    e) obtaining new image templates from said current image to replace the image templates that were purged, wherein said purging step (d) and said obtaining step (a) are performed in either the odd video fields only or the even video fields only in order to reduce video interlace stability problems.

3. A method for tracking motion in a stream of video images comprising the steps of:
    a) obtaining a set of image templates (block) from a current video image that meet certain template capturing criteria and storing said image templates in memory;
    b) determining the position of each stored image template with respect to the current image;
    c) calculating a transform model using the determined template positions with respect to the current image, said transform model being a descriptor of the change of position of said set of image templates;
    d) purging image templates from memory that do not meet certain template retention criteria; and
    e) obtaining new image templates from said current image to replace the image templates that were purged, wherein said obtaining step (a) is terminated after a preset time limit or after a sufficient number of image templates have been obtained, whichever event occurs first.

4. A method for tracking motion in a stream of video images comprising steps of:
    a) obtaining a set of image templates (block) from a current video image that meet certain template capturing criteria and storing said image templates in memory;
    b) determining the position of each stored image template with respect to the current image;
    c) calculating a transform model using the determined template positions with respect to the current image, said transform being a descriptor of the change of position of said set of image templates;
    d) purging image templates from memory that do not meet certain template retention criteria;
    f) obtaining new image templates from said current image to replace the image templates that were purged;
    g) determining an error surface indicating mismatches between each image template and the current image in a region proximate to the determined template position;
    h) evaluating said error surface to determine its minimum value in order to determine the best match between the image templates and the current image; and,
    i) using said error surface in said transform model calculations.

5. The method of claim 1 further comprising the step of:
    i) confirming the accuracy of said transform model by comparing its correspondence results against a set of previously defined synthetic templates.

6. The method of claim 5 wherein determining the position of each stored image template with respect to the current image comprises the steps of:
    j) performing an integer Position search in order to determine the minimum value of said error surface; and
    k) upon completion of said integer position search, performing a fractional pixel interpolation in order to estimate the fractional part of the motion of a small piece of the previous image to the current image.

7. The method of claim 6 wherein performing the integer position search comprises the steps of:
    l) positioning each template at several integer position locations in the image template and calculating an error surface for each location using the specified block matching criteria
    m) searching a series of template regions having an initial search region centered about a predicted template position derived from an estimation of the motion of a small piece of the previous image to the current image, said searching to determine image template size and shape;

n) terminating the search successfully if a minimum is found within the predicted search region; and o) terminating the integer position search unsuccessfully if, after several at tempts, a minimum cannot be found within the predicted search region and storing said information pertaining to the unsuccessful search so that the block may be later purged.

8. The method of claim 7 wherein said integer position search uses linear prediction techniques.

9. The method of claim 7 wherein said integer position search uses second-order polynomial prediction techniques.

10. The method of claim 7 wherein said error surface indicating mismatches between each image template and the current image in a region proximate to the determined template position is calculated according to the following block matching technique:

$$M = 1 - N = 1 - \frac{\sum IT}{\sqrt{\sum I^2 \sum T^2}}$$

where

M represents the mismatch value,

N represents a normalized correlation calculation,

I represents the pixel values in the current image, and

T represents the pixel values in the image template.

11. The method of claim 7 wherein said error surface indicating mismatches between each image template and the current image in a region proximate to the determined template position is calculated according to the following block matching technique:

$$M = 1 - BA = 1 - \frac{2 * \sum IT}{\sum I^2 + \sum T^2}$$

where

M represents the mismatch value,

BA represents an error surface calculation,

I represents the pixel values in the current image, and

T represents the pixel values in the image template.

12. The method of claim 7 wherein said error surface indicating mismatches between each image template and the current image in a region proximate to the determined template position is calculated according to the following block matching technique:

$$M = 1 - L1norm = 1 - \sum d$$

where

M represents the mismatch value,

L1 norm represents an error surface calculation, and d represents the difference in pixel values between the image template and the current image.

13. The method of claim 12 wherein the fractional pixel interpolation uses a triangular interpolation method.

14. The method of claim 7 wherein said error surface indicating mismatches between each image template and the current image in a region proximate to the determined template position is calculated according to the following block matching technique:

$$M = 1 - L2norm = 1 - \sum d^2$$

where

M represents the mismatch value,

L2 norm represents an error surface calculation, and d represents the difference in pixel values between the image template and the current image.

15. The method of claim 14 wherein the fractional pixel interpolation uses a parabolic interpolation method.

16. The method of claim 7 wherein the fractional pixel interpolation uses a three-halves power interpolation method.

17. The method of claim 7 wherein said evaluating said error surface to determine its minimum value in order to determine the best match between the image templates and the current image comprises the steps of:

p) expanding the image template yielding sub-pixel position values; and q) performing a further integer position search according to step (j) above at these sub-pixel locations.

18. The method of claim 7 wherein said evaluating said error surface to determine its minimum value in order to determine the best match between the image templates and the current image comprises the steps of:

r) obtaining error surface values proximate to the minimum value determined by the integer position search of step (j);

s) interpolating for a value at the horizontal scan line just above where the original integer position search determined a minimum, said interpolating carried out by a one dimensional method;

t) interpolating for a value at the horizontal scan line where the original integer position search determined a minimum, said interpolating carried out by a one dimensional method;

u) interpolating for a value at the horizontal scan line just below where the original integer position search determined a minimum, said interpolating carried out by a one dimensional method; and v) interpolating the values from steps (s), (t), and (u) to determine a final minimum value for said error surface.

19. The method of claim 7 wherein said evaluating said error surface to determine its minimum value in order to determine the best match between the image templates and the current image comprises the step of:

w) interpolating the position of the minimum using a singular value decomposition method.

20. The method of claim 7 wherein calculating said transform model comprises the steps of:

x) setting horizontal and vertical weights for each block depending on the curvature of the error surface;

y) calculating a preliminary transform model using a mean square error minimization method;

z) evaluating each block for spatial error to determine how well it agrees with the preliminary transform model;

aa) modifying said weights for each block according to the spatial error; and bb) calculating a final transform model using the modified block weights.

21. The method of claim 7 wherein said template retention criteria require that image templates, in order not to be purged, must not be in a horizontal blanking area, must not be in an active burn-in region, must agree with the current transform model with respect to position, and must have sufficient curvature of the error surface.

22. The method of claim 7 further comprising the steps of:
cc) low-pass filtering and sub-sampling said image templates obtained in step (a) in order to provide a series of lower resolution image templates;
dd) performing an integer position search on the image templates at each resolution level, starting with the lowest resolution level and working up;
ee) calculating a transform model at each resolution level in order to predict the positions of the image templates at the next highest level.

* * * * *